United States Patent [19]
Wang et al.

[11] Patent Number: 5,338,594
[45] Date of Patent: Aug. 16, 1994

[54] FOAM FILLED HONEYCOMB AND METHODS FOR THEIR PRODUCTION

[75] Inventors: Yen-Seine Wang, San Ramon; Frank Lee; Ching-Chi Kuo, both of Danville; Ken Baron, San Ramon, all of Calif.

[73] Assignee: Hexcel Corporation, Pleasanton, Calif.

[21] Appl. No.: 832,401

[22] Filed: Feb. 7, 1992

[51] Int. Cl.$^5$ ............................................. B32B 9/00
[52] U.S. Cl. ............................. 428/117; 428/71; 428/73; 428/76; 428/116; 428/118; 428/119; 428/458; 428/473.5; 156/197; 156/79; 156/77; 264/46.6; 264/321
[58] Field of Search .................. 428/117, 116, 71, 73, 428/158, 76, 116, 118, 119, 458, 473.5, 77, 308.4; 525/504, 523, 534, 390, 480; 264/46.6, 45.5, 321, 126; 156/197, 79, 77

[56] References Cited

U.S. PATENT DOCUMENTS

| | | | |
|---|---|---|---|
| 2,744,042 | 5/1956 | Pace | 428/117 X |
| 3,644,158 | 2/1972 | Strumbos | 428/117 X |
| 3,644,168 | 2/1972 | Bonk et al. | 428/116 |
| 3,834,962 | 9/1974 | Strumbos | 428/117 X |
| 3,970,324 | 7/1976 | Howat | 428/117 X |
| 4,088,723 | 5/1978 | Norton | 428/117 |
| 4,162,341 | 7/1979 | Norton | 428/117 |
| 4,917,742 | 4/1990 | Watanabe et al. | 428/117 X |
| 4,956,393 | 9/1990 | Boyd et al. | 521/54 |
| 4,970,276 | 11/1990 | Das et al. | 525/504 |
| 4,983,683 | 1/1991 | Shimp | 525/523 |
| 5,077,319 | 12/1991 | Wang et al. | 528/534 |
| 5,188,879 | 2/1993 | Hill et al. | 428/117 |

OTHER PUBLICATIONS

Copy of Appn. for "Cyanate-Resin-Based Foams" which Issued as U.S. Pat. No. 5,077,319.

*Primary Examiner*—Patrick J. Ryan
*Assistant Examiner*—Abraham Bahta
*Attorney, Agent, or Firm*—Poms, Smith, Lande & Rose

[57] ABSTRACT

High strength foam-filled materials and methods for their production are disclosed. The high strength materials include cellular structures comprising a plurality of open-ended cells containing polycyanurate foam. The polycyanurate foam-filled cellular structures have synergistically high mechanical properties and improved resistance to moisture. When cyanate ester foamable precursors in the form of tough films are foamed to fill honeycomb cells, the resulting foam-filled honeycomb has uniformly fine foam cell structure and improved bonding between the foam and the honeycomb.

28 Claims, 2 Drawing Sheets

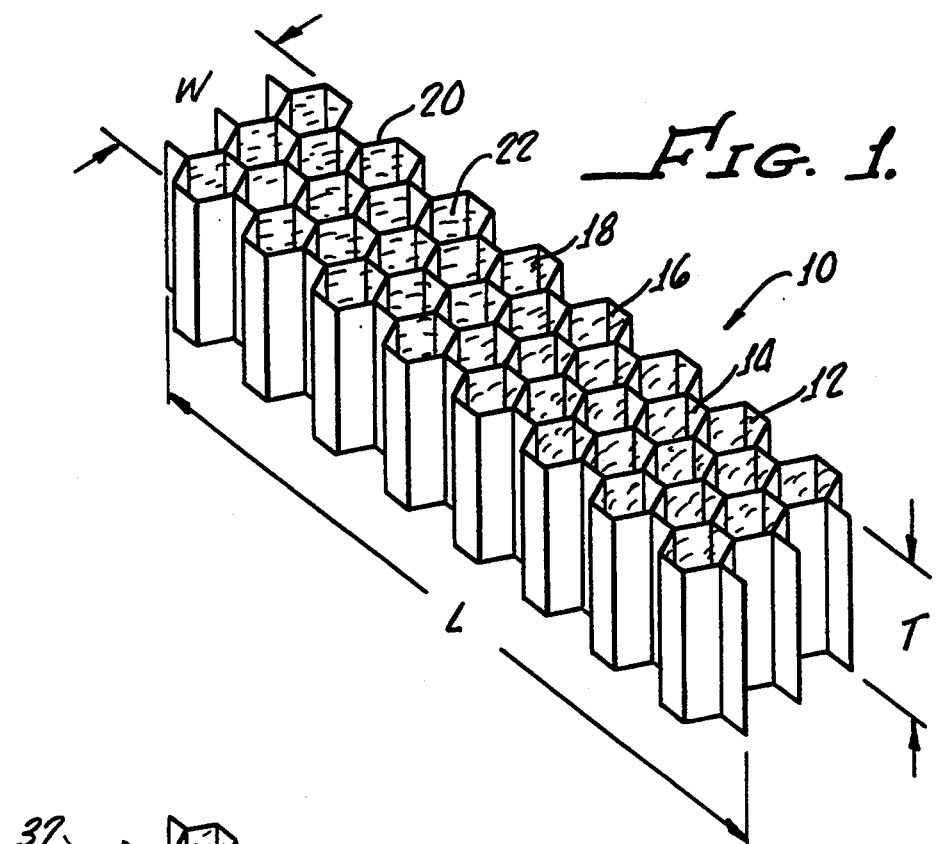
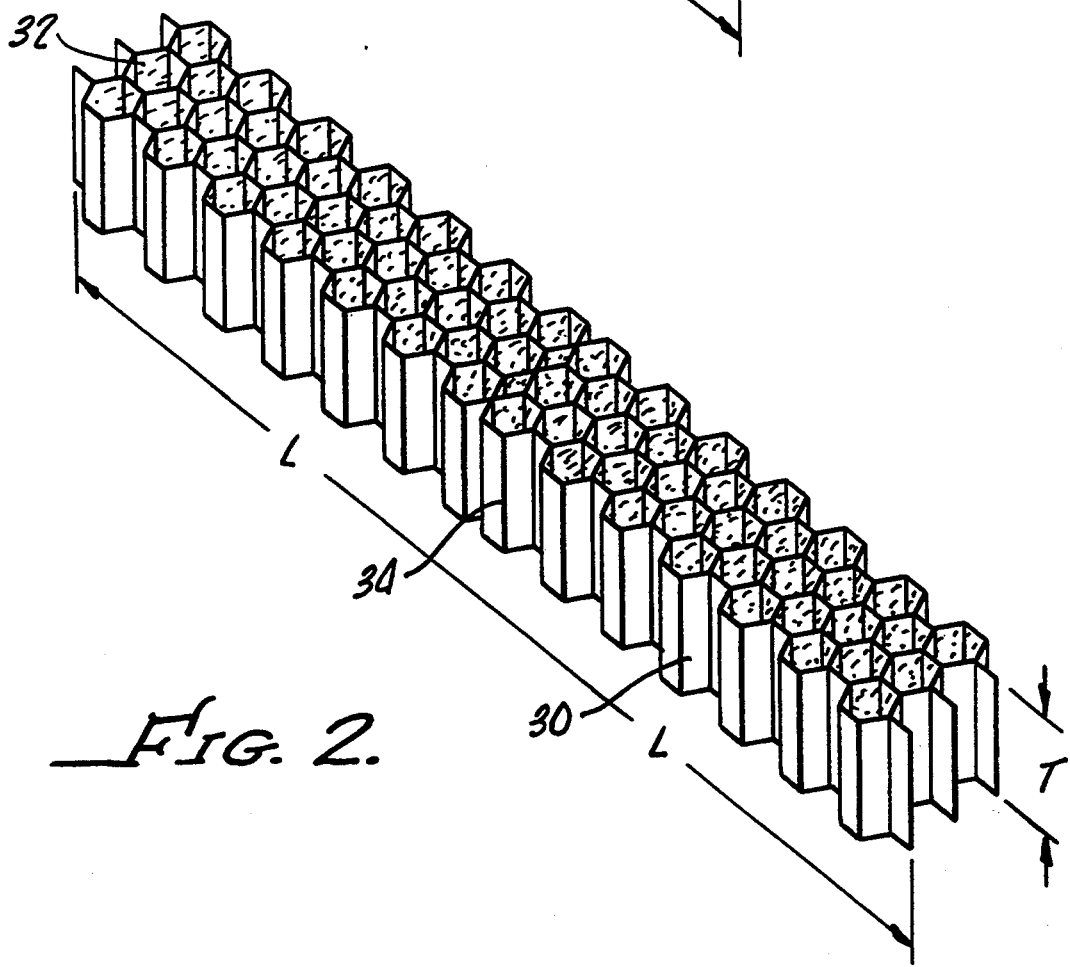

FOAM FILLED HONEYCOMB AND METHODS FOR THEIR PRODUCTION

BACKGROUND OF THE INVENTION

1. Field of the Invention

The present invention relates generally to high strength foam filled materials. More particularly, the present invention involves superior strength, uniform density polycyanurate foam filled honeycomb materials and methods for their production.

2. Description of Related Art

Light weight materials having a uniform cell structure are widely utilized in structurally and functionally demanding applications. By incorporating rigid foams within the cell structure of these materials, their compressive strength can be dramatically increased without severely affecting the density of the material. Foam filled honeycomb shaped structures, in particular, have wide utility as light weight insulation and structural materials in a variety of industries including the building and aerospace industry.

Frequently, the environmental conditions to which structural materials are exposed include high temperatures and high humidities. Thus, rigid foams incorporated in honeycomb materials exposed to these extreme conditions must be stable to elevated temperatures and resistant to moisture absorption and hydrolysis. Moreover, these foams should be resistant to fire and not be self-igniting at elevated temperatures. Additionally, methods for fabricating foam-filled honeycomb parts often require shaping the honeycomb using machining and cutting techniques. Thus, rigid foams which do not structurally withstand machining procedures are not suitable candidates for incorporating into honeycomb.

An important property to consider in evaluating the structural integrity of foam-filled honeycomb structures is the uniformity of the foam density. The process used to incorporate the foam within the cell preferably produces a foam having highly uniform and fine foam cell density with a strong adhesive bond between the foam and the cell walls.

Polymethacrylimide foamable precursors are foamed from a highly viscous composition. This foaming process is a three dimensional expansion which often results in damage to the honeycomb structure. When the polymethacrylimide is present as a viscous composition it does not wet the honeycomb walls during the foaming process and consequently does not form strong bonds with the honeycomb.

Another method for incorporating foam into honeycomb structures is known as a powder process in which a foamable powder is distributed evenly on a substantially flat surface and the honeycomb structure is then pressed into the powder. By adding heat to the foamable powder and honeycomb structure, the powder foams and fills the honeycomb cells. This powder blowing method typically results in foams having an uneven density distribution exemplified by foams with cell sizes which vary from one honeycomb cell to the next. This density problem is generally attributed to difficulties in forming an even distribution of foamable powder prior to initiating the foaming process.

Accordingly, it is an objective of the present invention to provide foam filled honeycomb structures having reduced moisture sensitivity and improved strength over prior art foam filled honeycomb. It is also an objective of the present invention to provide foam filled honeycomb having highly uniform and controlled foam density with superior bond adhesive strength between the foam and honeycomb cell walls.

SUMMARY OF THE INVENTION

The present invention accomplishes the above-described objectives and others by providing high strength cellular materials with a highly moisture resistant foam incorporated in the cells of the material. Additionally, the combination of cellular material and foam has a synergistic effect in the mechanical properties of the combination. That is, the strength of the cellular materials with the foam incorporated in the cells of the material is greater than the total strength of the cellular materials and the foam. Furthermore, in accordance with the present invention, processes are provided for forming high strength foam filled materials in which foamable precursors are foamed to fill cellular materials with a resulting highly uniform and consistent cell density.

The high strength structural materials of the present invention include a plurality of open-ended cells arranged side-by-side and defining a geometric structure, with a quantity of polycyanurate foam contained in the open-ended cells. The polycyanurate foam is based upon the polymerization product of cyanate esters and preferably additionally includes a thermoplastic polymer and a surfactant. Exemplary embodiments include from about 5 w/w % to about 95 w/w % polycyanurate, from about 1 w/w % to about 90 w/w % thermoplastic polymer, and from about 0.01 w/w % to about 5 w/w % surfactant. Such exemplary embodiments can further include excess foaming or blowing agents or decomposition products of blowing agents utilized during foaming processes.

According to the teachings of the present invention foam filled structural materials are prepared by positioning a foamable cyanate ester precursor on a substrate, placing a cellular material having open-ended cells over the foamable cyanate ester precursor, and causing the foamable precursor to foam so that the open-ended cells contain polycyanurate foam. As a feature of the present invention, the foamable cyanate ester precursor is in the form of a film, which when caused to foam, expands unidirectionally to fill the cells. This unidirectional expansion results in the cell walls of the structural material having increased dimensional integrity. Moreover, the resulting foam has increased uniformity in its density contributing to the improved structural strength of the foam filled material.

Additional features and advantages of the present invention will become apparent from the following detailed description, taken in conjunction with the accompanying drawings which illustrate, by way of example, the principles of the present invention.

BRIEF DESCRIPTION OF THE DRAWINGS

FIG. 1 is a schematic illustration of a cellular material, in the form of a honeycomb, having cells suitable for incorporating polycyanurate foam.

FIG. 2 is a schematic illustration of spliced foam-filled honeycomb in accordance with the present invention.

DESCRIPTION OF THE PREFERRED EMBODIMENTS

Figure 3:
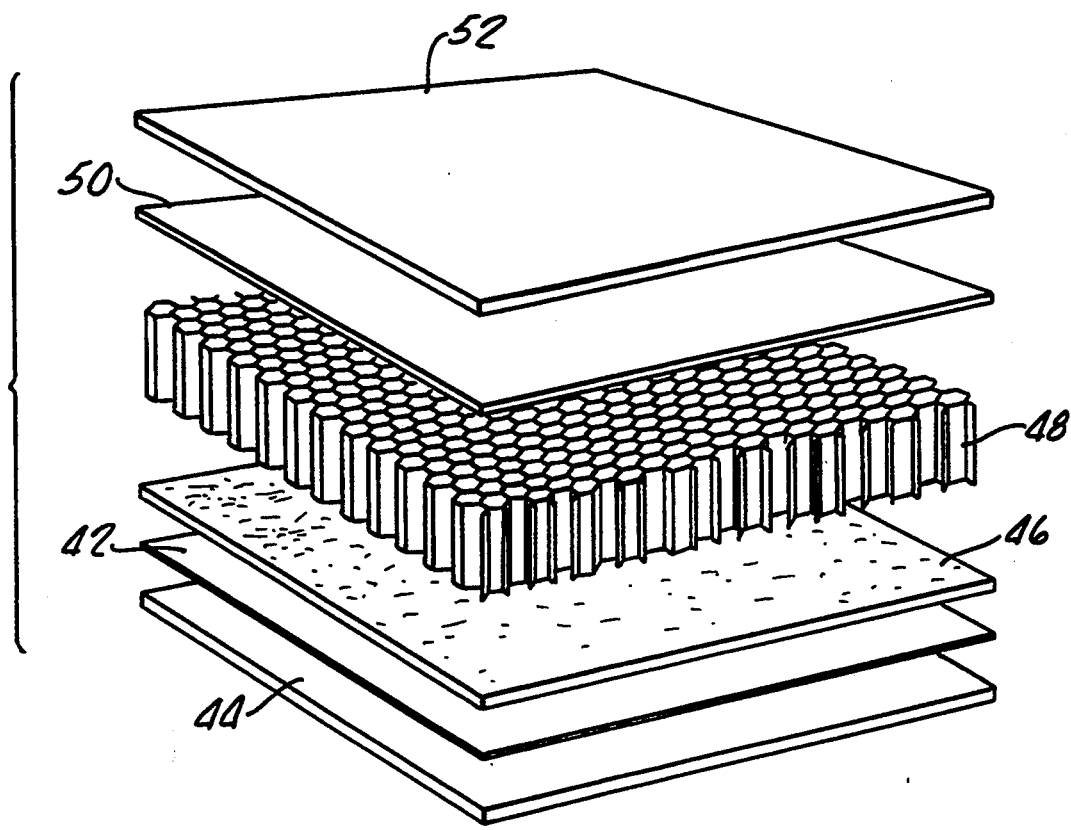
FIG. 3 is a schematic illustration of a process in accordance with the present invention for forming foam filled honeycomb.

The foam filled high strength structural materials of the present invention and processes for their formation are generally applicable to cellular core materials having open-ended cells for incorporating rigid foam for the purpose of increasing their mechanical strength. In particular, honeycomb materials are benefitted by the teachings of the present invention because of their proven structural applications in a wide range of industries. Accordingly, while the foam filled structural materials of the present invention are described herein by reference to foam-filled honeycomb, it is understood that other foam filled structures can be equally benefitted by the teachings of the present invention.

The present invention is based upon the discovery that polycyanurate foams, previously described in U.S. Pat. No. 5,077,319, can be incorporated into the open-ended cells of honeycomb core to provide foam-filled honeycomb having improved moisture resistance and synergistic increases in mechanical strength. Moreover, the herein described processes for preparing the foam-filled honeycomb of the present invention result in a uniformly distributed foam cell structure which exhibits high foam to honeycomb cell bond strength.

Turning to FIG. 1, there is shown a schematic drawing of a high strength structural material 10 of the present invention, in the form of a plurality of open-ended cells, generally illustrated as numerals 12, 14, 16, 18, arranged side-by-side and defining a geometric shape 20, and a quantity of polycyanurate foam 22 contained in the open-ended cells 12, 14, 16, 18. In order to obtain the highest degree of structural strength from the structural material, each of the open-ended cells is preferably filled with the polycyanurate foam as shown in FIG. 1. However, it is fully within the present invention to provide structural material having partially filled open-ended cells.

The preferred geometric shape 20 is hexagonal, characteristic of honeycomb material, and illustrated in FIG. 1. As mentioned above, however, alternative geometric shapes, including circular and multi-sided geometries are contemplated to be within the scope of the present invention.

The polycyanurate foam contained in the open-ended cells is the polymerization product of one or more cyanate esters having the following general structure:

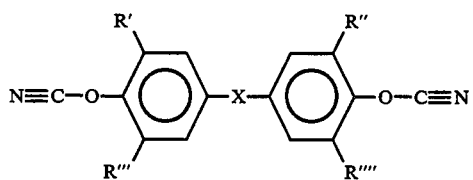

wherein R', R", R''', and R'''' and are selected from the group consisting of H, $C_1$-$C_6$ alkyl, $C_1$-$C_6$ alkoxy, phenyl, mono, di and tri-substituted phenyl, halogen aryl, aryloxy, nitro, thio and —COOH; and X is a biphenol linking group selected from the group consisting of alkyl, cycloalkyl, S, O, N, phenyl, phenylalkyl, and divalent fused ring systems.

Suitable cyanate esters having this general structure include but are not limited to the following:

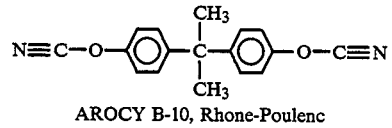
AROCY B-10, Rhone-Poulenc

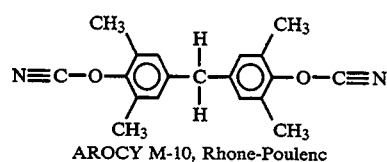
AROCY M-10, Rhone-Poulenc

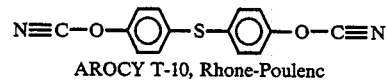
AROCY T-10, Rhone-Poulenc

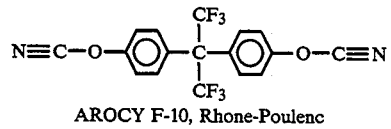
AROCY F-10, Rhone-Poulenc

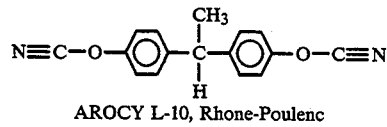
AROCY L-10, Rhone-Poulenc

XU 71787.00L, Dow Chemical

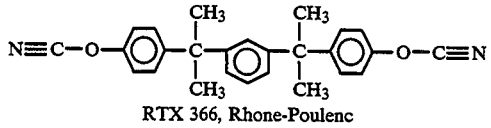
RTX 366, Rhone-Poulenc

Preferred exemplary polycyanurate foams utilized in the high strength materials of the present invention additionally incorporate at least one thermoplastic polymer which is present in the form of a homogeneous blend with the polycyanurate. The usefulness of thermoplastic polymers is attributed to their apparent usefulness in improving the mechanical properties of the foam, maintaining a uniform distribution of fine cell structure, and, as discussed in more detail below, their ability to form tough films. In order to provide a homogeneous blend of polycyanurate and thermoplastic polymer, the thermoplastic polymer should be compatible with the cyanate ester and polycyanurate. Suitable compatible thermoplastic polymers include, but are not limited to, polyethersulfones, polyvinylbutyrals, polysulfones, polyimides, polyacrylates, polyether ethylketones, polyetherimides, polyvinylformals, polyethylene oxides, and copolyesters.

Exemplary embodiments of the high strength materials of the present invention contain foams of from about 5 w/w % to about 95 w/w % polycyanurate and from about 1 w/w % to about 90 w/w % thermoplastic polymer and up to about 5 w/w % excess blowing agent or their decomposition products. The preferred concentration ranges for these exemplary embodiments are from about 50 w/w % to about 90 w/w % polycyanurate and from about 5 w/w % to about 50 w/w % thermoplastic polymer.

The polycyanurate foams utilized in preferred exemplary embodiments of the present invention additionally include from about 0.01 w/w % to about 5 w/w % surfactant with a preferred surfactant concentration of from about 0.01 w/w % to about 0.5 w/w %. Surfactants contribute to both uniform and controlled size of the foam cells by altering the surface tension of bubbles formed during the foaming process. Surfactants also contribute to high surface bonding between the polycyanurate foam and the open-ended cells by lowering the surface tension between the two surfaces. Suitable surfactants are those capable of forming homogeneous and compatible systems with other components of the foam. Exemplary surfactants include polysiloxanes, anionic surfactants such as carboxylates and sulfonates, non-ionic surfactants such as polyalkyloxides and ethoxylated alcohols, cationic surfactants such as quaternary ammonium salts, and amphoteric surfactants.

Preferred exemplary high strength structural materials of the present invention are honeycomb cores filled with a foam which includes a homogeneous blend of about 55 w/w % of the polycyanurate obtained by the polymerization of the cyanate ester having the following formula:

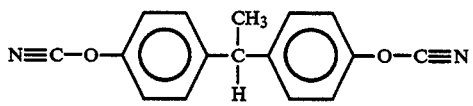

about 43 w/w % polyethersulfone, and less than about 1 w/w % polysiloxane surfactant and blowing agent decomposition products. A particularly suitable polyethersulfone is available from ICI and a compatible polysiloxane based surfactant known to provide suitably sized foam cells is available from Dow Corning under the Tradename DC-193. The above-identified cyanate ester is available from Rhone-Poulenc under the tradename L-10. Suitable honeycomb structures are those formed of metals, particularly aluminum, and polymer based honeycomb such as the Nomex Aramid fiber and fiberglass. A preferred blowing agent is Kempore 150. The preferred foam-filled honeycomb structures of the present invention have densities of less than 15 pcf and typically the density ranges from about 5 pcf to about 10 pcf.

In addition to providing single sections of polycyanurate foam-filled honeycomb as described above, the present invention further provides for foam-filled honeycomb in the form of spliced sections. As illustrated in FIG. 2, this alternative embodiment includes at least one series of polycyanurate foam-filled honeycomb 30 spliced to an adjacent series of foam-filled honeycomb 32 forming at least two side-by-side series of polycyanurate foam of foam-filled honeycomb spliced by foam 34. As described in more detail below, the adhesive 34 is preferably a polycyanurate foam formed by foaming a film of polycyanurate foam precursor.

As a feature of the present invention, processes are provided for preparing high strength materials in which a plurality of open-ended cells is filled with foam resulting in foamed filled structures having synergistically improved mechanical properties. These processes include providing a cyanate ester foamable precursor composition on a substrate, positioning a cellular material over the foamable precursor composition so that the plurality of open-ended cells is adjacent the foamable precursor composition, and causing the foamable precursor composition to foam and expand into the open-ended cells.

In order to provide the cyanate ester foamable precursor composition the ingredients are formulated and mixed at an elevated temperature to partially cure the composition. Suitable formulations include cyanate esters, thermoplastic polymers, and surfactants described above including from about 5 w/w % to about 90 w/w % cyanate ester, from about 1 w/w % to about 95 w/w % thermoplastic polymer, and from about 0.05 w/w % to about 5 w/w % surfactant. Preferred exemplary embodiments of the present invention additionally include from about 0.1 w/w % to about 5 w/w % blowing agent and optionally a catalyst.

Blowing agents are compounds which decompose to a gaseous by-products and thus cause the precursor composition to expand and foam. Blowing agents are characterized by the temperature at which they decompose, and the preferred agents decompose at temperatures which correspond to the final cure state of the selected cyanate ester. Suitable blowing agents include, but are not limited to ethylenecarbonate, 5-phenyltetrazole, p-toluenesulfonyl semicarbazide, urea, dimethylurea, and formamide. Because of its compatibility and ability to additionally catalyze the cyanate ester cure, a preferred blowing agent is azodicarbonamide. As catalyst and blowing agent, azodicarbonamide decomposes simultaneous with increasing the rate of cyanate ester cure.

Preferred foamable precursor formulations additionally include up to about 1 w/w % ethylenecarbonate. This blowing agent contributes to the foam producing capabilities of the precursor formulation without accelerating the rate of cure of the cyanate ester.

In formulating the precursor composition, the concentration of cyanate ester and the concentration of thermoplastic polymer should be balanced to obtain the desired processing properties, the desired foamable precursor physical properties and the desired foam properties. As is described in more detail below, the desired foamable precursor is in the form of a slightly tacky film capable of handling and transporting. Preferred physical properties relate to the viscosity of the formulation with higher viscosities corresponding to higher concentrations of thermoplastic. The viscosity should be low enough to allow easy cell expansion during the foaming process, yet high enough so that cell expansion is not so excessive that cells collapse during the foaming process. Generally, thermoplastic polymer concentrations of at least about 30 w/w % provide the desired properties. This is dependent, however, upon the choice of thermoplastic polymer and can vary depending upon the extent of the solubility of the thermoplastic polymer in the cyanate ester resin.

Mixing the foamable precursor composition also includes incorporating surfactant, blowing agent and any catalyst included in the formulation with the cyanate ester and thermoplastic polymer. Moreover, the mixing process should result in a homogeneous mixture of cyanate ester resin, thermoplastic polymer, surfactant, blowing agent and catalyst. In order to provide thermoplastic polymer loadings on the order of 30 w/w % to 50 w/w % of, for example polyethersulfone (PES), very fine PES powder should be used during the mixing process. This enhances and expedites the solubilization of the thermoplastic polymer in the cyanate ester. In order to assure the thorough solubilization or dispersion of catalyst, surfactant and blowing agent, the mixing process should include intensive mixing for a relatively short period of a few minutes.

Subsequent to obtaining a homogeneous mixture of cyanate ester, thermoplastic polymer, and additives including surfactant, blowing agent, and catalyst, the mixture is heated and mixed for a short period to partially cure the cyanate ester. Mixing temperatures range up to about 150° C. Suitable mixing times range from a few minutes to over an hour and depend upon the amount of catalyst present and the preferred extent of cure. Finally, the heated homogeneous mixture is preferably cast to a film having a thickness of from about 0.1 mm to about 3 mm. Convenient working films are continuously formed and are about 8 inches wide with about 280 g of foamable precursor per square meter. Advantageously, when higher density foams are desired, precursor films can be layered to obtain the effect of thicker films. After the foamable precursor film is positioned on a substrate and the cellular structural material is placed on the precursor film a preferable resulting configuration of cellular structural material, foamable precursor film, and substrate is illustrated in FIG. 3. The substrate includes a release cloth 42 positioned over a caul plate 44. The foamable precursor film 46 is sandwiched between the cellular structural material 48, here shown as honeycomb and a second layer of release cloth 50. Finally, a second caul plate 52 is position over release cloth 50.

In order to cause the foamable precursor film to foam and expand into the open-ended cells, the configuration illustrated in FIG. 3 is preferably placed in a hot press and heated under pressure. This step results in a unidirectional foaming and expansion of the precursor film into the open-ended cells of the honeycomb due to the action of the catalyst and blowing agent. As the expansion progresses, the foam forms a skin at the release cloth at each end of the open-ended cells. The release cloth is preferably formed of a porous material, which allows excess gases to vent from the cells.

The resulting foamed filled cellular structure has synergistically high compressive strength in the W and L directions perpendicular to the axis of the open-ended cells. Additionally, the resulting foam filled cellular structure exhibits high bond strength between the foam and the cell walls contributing to an overall increase in the structural integrity of the foam-filled material. Moreover, the foam in each cell has an integrated structure, with a lower density at the center of each cell and a gradual increase in density extending to the portion of the foam which skins over.

In an alternative embodiment of the above-described foaming procedure, at least two honeycomb blocks are spliced together by positioning blocks side-by-side over a suitable foamable precursor film. When heat is applied to the honeycomb blocks and foamable precursor, the foaming expansion takes place into the open-ended cells of the honeycomb blocks. The result is at least two honeycomb blocks spliced together by the foamed precursor.

A further understanding of the foam-filled structural materials of the present invention, as well as processes for their formation will be afforded to those skilled in the art from the following non-limiting examples of exemplary embodiments thereof.

EXAMPLE 1

A polycyanurate foam-filled honeycomb was prepared according to the following procedure. The cyanate ester, thermoplastic polymer, blowing agents, and surfactant in the amounts detailed in Table I were mixed at room temperature until homogeneous using a shear blade. The homogeneous mixture was then mixed at 120° C. for 10 minutes in a double planetary mixer. This mixing step was followed with a 5 minute deaerating step under a partial vacuum.

The homogeneous deaerated mixture was then removed from the double planetary mixer and cast into a continuous foamable precursor film through a reverse roll film caster. Then, film segments were prepared, each film segment having dimensions of about 20 cm×20 cm. About 4 film segments weighing a total of 52 grams were stacked on a sheet of release cloth which was sandwiched between a non-porous teflon release cloth and a caul plate as generally shown in FIG. 3. An HFT honeycomb having a ⅛" cell size and a density of 3 pcf was placed on the foamable precursor film and a second set of porous cloth, non-porous teflon cloth and a caul plate was placed on top of the HFT honeycomb. This whole assembly was then placed in a hot press at 193° C. and 35 psi for an hour. During this time unidirectional expansion, foaming and cyanate ester cure occurs.

Following the foaming and curing process, a cross-section of the foam-filled honeycomb structure was visually examined for foam density characteristics and the apparent integrity of the bond between the cell walls and the foam. The results indicated excellent bond integrity and uniform foam density. The measured density of the cross-section of foam-filled honeycomb was about 9.1 pcf. The compressive strength at room temperature and at 350° F. (about 176° C.) is shown in Table II.

TABLE I

| Formulation of homogeneous mixture of Example 1 | | |
| --- | --- | --- |
| L-10 | 54.32 w/w % | Cyanate ester available from Rhone-Poulenc |
| Polyethersulfone | 42.68 | Thermoplastic available from ICI |
| azodicarbonamide | 1.93 | Blowing agent and catalyst available from Uniroyal |
| DC-193 | 0.10 | Surfactant available from Dow Corning |
| Ethylenecarbonate | 0.97 | blowing agent |

TABLE II

| | Compressive Strength in PSI | | |
| --- | --- | --- | --- |
| Temp. | Cyanate Foam (6.1 pcf) | Honeycomb (HFT) (3 pcf) | Foam-filled Honeycomb (9.1 pcf) |
| 70° F. | 250 | 447 | 902 |
| 350° F. | 120 | 298 | 486 |

The data presented in Table II illustrate a synergistic effect on the mechanical strength resulting from the above-described process. That is, the compressive strength of the foam-filled honeycomb is greater than the total compressive strength of honeycomb and foam.

EXAMPLE 2

A foam filled HRH (Nomex) honeycomb was prepared using the formulation detailed in Table III and the general procedure described in Example 1 with the exception of the hot press temperature which was 200° C. Table IV illustrates the results of compressive strength tests which were performed on sections of the foam-filled HRH honeycomb.

TABLE III

| | |
|---|---|
| L-10 | 54.44 w/w % |
| polyethersulfone | 42.78 |
| Azodicarbonamide | 1.71 |
| ethylenecarbonate | 0.97 |
| DC-193 | 0.10 |

TABLE IV

| | Compressive Strength in PSI | | |
|---|---|---|---|
| Temp. | Cyanate Foam (5.8 pcf) | Honeycomb (HRH-10) (3 pcf) | Foam-filled Honeycomb |
| 70° F. | 220 | 300 | 865 (8.8 pcf) |

The data shown in Table IV illustrate the similar synergistic effect of providing polycyanurate foam-filled HRH-10 honeycomb.

EXAMPLE 3

Polycyanurate foam-filled honeycomb was prepared as described in Example 1. Additionally, prior art polyimide foam filled honeycomb was provided. Samples of the polycyanurate foam-filled honeycomb and the polyimide foam filled honeycomb were submerged in water at room temperature over a period of 3 days. The samples were removed daily and weighed to determine the amount of water uptake in each sample. Table V details the % increase from the initial sample weight experienced for the polycyanurate foam filled honeycomb and the polyimide foam filled honeycomb.

TABLE V

| Percent increase in sample weight due to water absorption | | |
|---|---|---|
| Days in water | Polyimide foam filled honeycomb | polycyanurate foam filled honeycomb |
| 1 | 72.2% | 1.74 |
| 2 | 93.6 | 2.52 |
| 3 | 123.3 | 4.34 |

Results indicate that the polycyanurate has substantially greater resistance to water absorption. This property makes polycyanurate foam filled honeycomb structures particularly useful in applications where the possibility of water accumulation in the cells is detrimental.

EXAMPLE 4

In order to fabricate a laminate of two honeycomb structures spliced together, a foamable precursor film was prepared as in Example 1. Then film segment measuring about 8"×8" and weighing 104 grams total were positioned on release cloth and a caul plate. Then one 5"×8" HFT honeycomb and one 3"×8" HFT honeycomb were placed side-by-side on the foamable precursor film. Both honeycomb structures had a density of 4 pcf and were 1" thick. The foamable precursor film, the two honeycomb HFT structures release cloth and caul plate were sandwiched between a porous cloth and non-porous teflon and caul plate as described in Example 1 and foamed in a hot press at 170° C., 35 psi for 30 minutes. The resulting foam filled honeycomb is rigid and has a density of about 10 pcf. This advantageously low density measures very favorably against high density syntactic foam filled honeycomb which is typically about 40 pcf and is frequently found in spliced form.

It is apparent that many modifications and variations of this invention, as set forth above, may be made without departing from the spirit and scope thereof. The specific embodiments described are given by way of example only, and the invention is limited only by the terms of the appended claims.

We claim:

1. A high strength structural material having improved mechanical properties, said structural material comprising:

a cellular material comprising a plurality of open-ended cells arranged side-by-side defining a geometric shape;

said open-ended cells filled with polycyanurate foam wherein said cellular material containing the foam exhibits a compressive strength greater than that obtained by adding the compressive strength of said cellular material to the compressive strength of said foam.

2. The high strength structural material of claim 1 wherein said polycyanurate foam includes from about 5 w/w % to about 95 w/w % of a polymerized cyanate ester and from about 1 w/w % to about 90 w/w % of a thermoplastic polymer.

3. The high strength structural material of claim 2 wherein said cyanate ester has the formula:

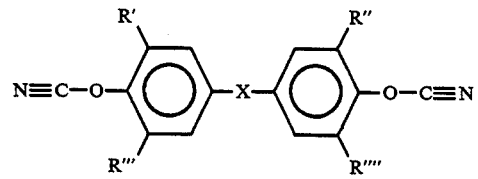

wherein

R', R", R''', and R'''' are selected from the group consisting of H, $C_1-C_6$ alkyl, $C_1-C_6$ alkoxy, phenyl, mono-substituted phenyl, di-substituted phenyl and tri-substituted phenyl, haloaryl, aryloxy, nitro, thio and carboxy; and X is a biphenol linking group selected from the group consisting of alkyl, cycloalkyl, S, O, N, phenyl, phenylalkyl, and divalent fused ring systems.

4. The high strength structural material of claim 2 wherein said thermoplastic polymer is selected from the group consisting of polyvinyl butyrals, polysulfones, polyethersulfones, polyimides, polyacrylates, polyetherethylketones, polyetherimides, polyvinylformals, polyethylene oxides, and copolyesters.

5. The high strength structural material of claim 4 wherein said thermoplastic polymer is a polyethersulfone.

6. The high strength structural material of claim 1 wherein said polycyanurate foam comprises a polymerized cyanate ester, said cyanate ester having the formula:

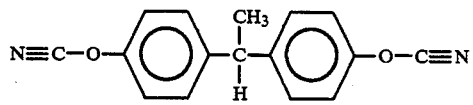

7. The high strength structural material of claim 1 wherein said plurality of open-ended cells defining a geometric shape is a honeycomb structure.

8. The high strength structural material of claim 1 wherein the foam containing cellular material has a room temperature compressive strength ranging from about 500 psi to about 1000 psi and a density of less than 15 pcf.

9. The high strength structural material of claim 1 wherein said polycyanurate foam containing cells form a series and said series is spliced to at least one additional series of polycyanurate foam containing cells, said at least two series of polycyanurate foam containing cells positioned side-by-side.

10. A high strength structural material having improved mechanical properties, said structural material comprising:
a plurality of open-ended cells forming a honeycomb shaped structure; and
a quantity of foam contained in each open-ended cell, said foam comprising a polycyanurate, a thermoplastic, and a surfactant wherein said honeycomb shaped structure containing said foam exhibits a compressive strength greater than that obtained by adding the compressive strength of said honeycomb shaped structure to the compressive strength of said foam.

11. The high strength structural material of claim 10 wherein said foam includes from about 5 w/w % to about 95 w/w % of a polycyanurate, from about 1 w/w % to about 90 w/w % of a thermoplastic polymer, and from about 0.01 w/w % to about 5 w/w % of a surfactant.

12. The high strength structural material of claim 11 wherein said thermoplastic is selected from the group consisting of polyvinyl butyrals, polysulfones, polyethersulfones, polyimides, polyacrylates, polyetherethylketones, polyetherimides, polyvinylformals, polyethylene oxides, and copolyesters.

13. The high strength structural material of claim 10 wherein said foam includes from about 30 w/w % to about 60 w/w % of a polymerized cyanate ester, said cyanate ester having the formula:

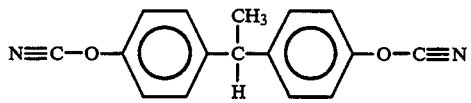

from about 5 w/w % to about 60 w/w % of a polyethersulfone, and from about 0.1 w/w % to about 5 w/w % of a surfactant.

14. The high strength structural material of claim 13 wherein said surfactant is a polysiloxane.

15. A method for preparing foam filled structural material, said structural material having a plurality of open-ended cells arranged side-by-side forming a geometric shape, said method comprising the steps of:
providing a cyanate ester foamable precursor composition on a substrate;
positioning said structural material over said foamable precursor composition so that said series of open-ended cells is adjacent to said foamable precursor composition; and
causing said foamable precursor composition to foam into said open-ended cells.

16. The method of claim 15 wherein said cyanate ester based foamable precursor composition includes from about 5 w/w % to about 95 w/w % cyanate ester, from about 1 w/w % to about 90 w/w % thermoplastic polymer, from about 0.05 w/w % to about 5 w/w % catalyst, and from about 0.1 w/w % to about 5 w/w % surfactant.

17. The method of claim 16 wherein said cyanate ester based foamable precursor composition further includes a blowing agent.

18. The method of claim 15 wherein said cyanate ester has the formula:

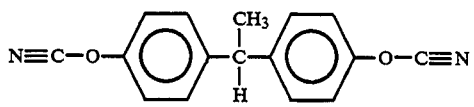

19. The method of claim 16 wherein said thermoplastic polymer is selected from the group consisting of polyvinyl butyrals, polysulfones, polyether sulfones, polyimides, polyacrylates, polyetherethylketones, polyetherimides, polyvinylformals, polyethylene oxides, and copolyester.

20. The method of claim 15 wherein said cyanate ester foamable precursor composition includes from about 30 w/w % to about 60 w/w % cyanate ester having the formula:

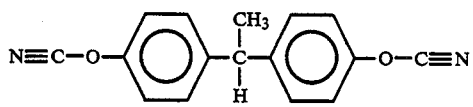

from about 5 w/w % to about 60 w/w % polyethersulfone, from about 0.01 w/w % to about 0.5 w/w % surfactant, from about 0.1 w/w % to about 2 w/w % catalyst, and from about 0.1 w/w % to about 2 w/w % blowing agent.

21. The method of claim 20 wherein said catalyst is azodicarbonamide.

22. The method of claim 20 wherein said blowing agent is selected from the group consisting of azodicarbonamide and ethylenecarbonate.

23. The method of claim 15 wherein providing said cyanate based foamable precursor composition on said release material is accomplished by heating said cyanate based foamable precursor composition, forming a film of said heated cyanate based foamable precursor, and positioning said film on said release material.

24. The method of claim 15 further including the steps of positioning a layer of release material over said open-ended cells opposite said cyanate based foamable precursor composition, and applying heat and pressure to said series of open-ended cells and foamable precursor composition.

25. The method of claim 24 wherein said heat is sufficient to provide a temperature of between about 150° C. to about 220° C., and said pressure is about 35 psi.

26. A method for filling honeycomb cells with foam, said method comprising the steps of:
heating a foamable precursor composition of about 54 w/w % cyanate ester having the formula:

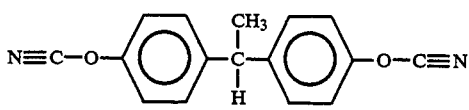

about 43 w/w % polyethersulfone, about 2 w/w % azocarbonamide, about 1 w/w % ethylenecarbonate, and about 0.1 w/w % polysiloxane surfactant;

forming a film of said heated foamable precursor composition;

layering said film on porous release cloth;

placing a honeycomb structure adjacent said film so that said honeycomb cells are positioned over said film; and applying sufficient heat and pressure to said honeycomb and film to foam said foamable precursor.

27. The high strength structural material of claim 1 wherein the foam containing cellular material has a room temperature compressive strength ranging from about 800 psi to about 900 psi and a density of less than 15 pcf.

28. The high strength structural material of claim 11 wherein said polycyanurate is a polymerized cyanate ester, said cyanate ester having the formula:

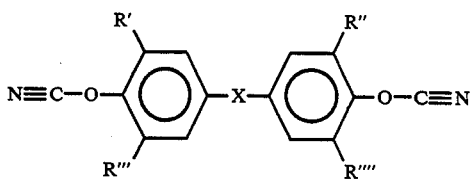

wherein

R', R'', R''', and R'''' are selected from the group consisting of H, $C_1$–$C_6$ alkyl, $C_1$–$C_6$ alkoxy, phenyl, mono-substituted phenyl, di-substituted phenyl and tri-substituted phenyl, haloaryl, aryloxy, nitro, thio and carboxy; and X is a biphenol linking group selected from the group consisting of alkyl, cycloalkyl, S, O, N, phenyl, phenylalkyl, and divalent fused ring systems.

* * * * *